(12) United States Patent
Michon

(10) Patent No.: US 6,893,102 B2
(45) Date of Patent: May 17, 2005

(54) SAFETY BRAKING DEVICE AND A BRAKING SYSTEM COMPRISING SUCH DEVICE

(75) Inventor: Jean-Pierre Michon, Saint Pathus (FR)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/489,938

(22) PCT Filed: Sep. 10, 2002

(86) PCT No.: PCT/FR02/03064

§ 371 (c)(1),
(2), (4) Date: Mar. 17, 2004

(87) PCT Pub. No.: WO03/026942

PCT Pub. Date: Apr. 3, 2003

(65) Prior Publication Data

US 2005/0000761 A1 Jan. 6, 2005

(30) Foreign Application Priority Data

Sep. 26, 2001 (FR) .............................. 01 12401

(51) Int. Cl.$^7$ ............................. B60T 8/40; B60T 7/04; B60T 7/06
(52) U.S. Cl. ..................... 303/191; 188/151 A; 303/87; 303/113.1
(58) Field of Search ............................. 303/113.1, 191, 303/114.1–114.2, 114.3; 188/355–359, 151 A; 180/271, 274, 275; 74/512, 513; 60/533; 293/5; 138/26, 30, 31

(56) References Cited

U.S. PATENT DOCUMENTS

| 5,174,637 | A | * | 12/1992 | Kervagoret | ............ | 303/117.1 |
| 5,927,821 | A | * | 7/1999 | Bauer et al. | ............ | 303/1 |
| 6,520,044 | B1 | * | 2/2003 | Douglass | ............ | 74/512 |
| 6,565,160 | B1 | * | 5/2003 | Ewing et al. | ............ | 303/1 |
| 6,672,682 | B2 | * | 1/2004 | Ewing et al. | ............ | 303/1 |

FOREIGN PATENT DOCUMENTS

| EP | 0230213 A2 | * | 7/1987 |
| GB | 2345107 | * | 6/2000 |
| JP | 11048950 | * | 2/1999 |
| JP | 2000280877 | * | 10/2000 |
| WO | WO9725232 | * | 7/1997 |
| WO | WO9907587 | * | 2/1999 |
| WO | WO9960457 | * | 11/1999 |
| WO | WO0000373 | * | 1/2000 |
| WO | WO03/026942 | * | 4/2003 |

* cited by examiner

Primary Examiner—Douglas C. Butler
(74) Attorney, Agent, or Firm—Leo H McCormick, Jr.; Warren Comstock

(57) ABSTRACT

The present invention mainly relates to an improved-safety braking device, intended for reducing the injury risks concerning the driver, owing to the brake pedal if a collision happens, in particular a front impact and, more particularly, the invention deals with an electrohydraulic braking device having a variable hydraulic reaction.

Figure 1:
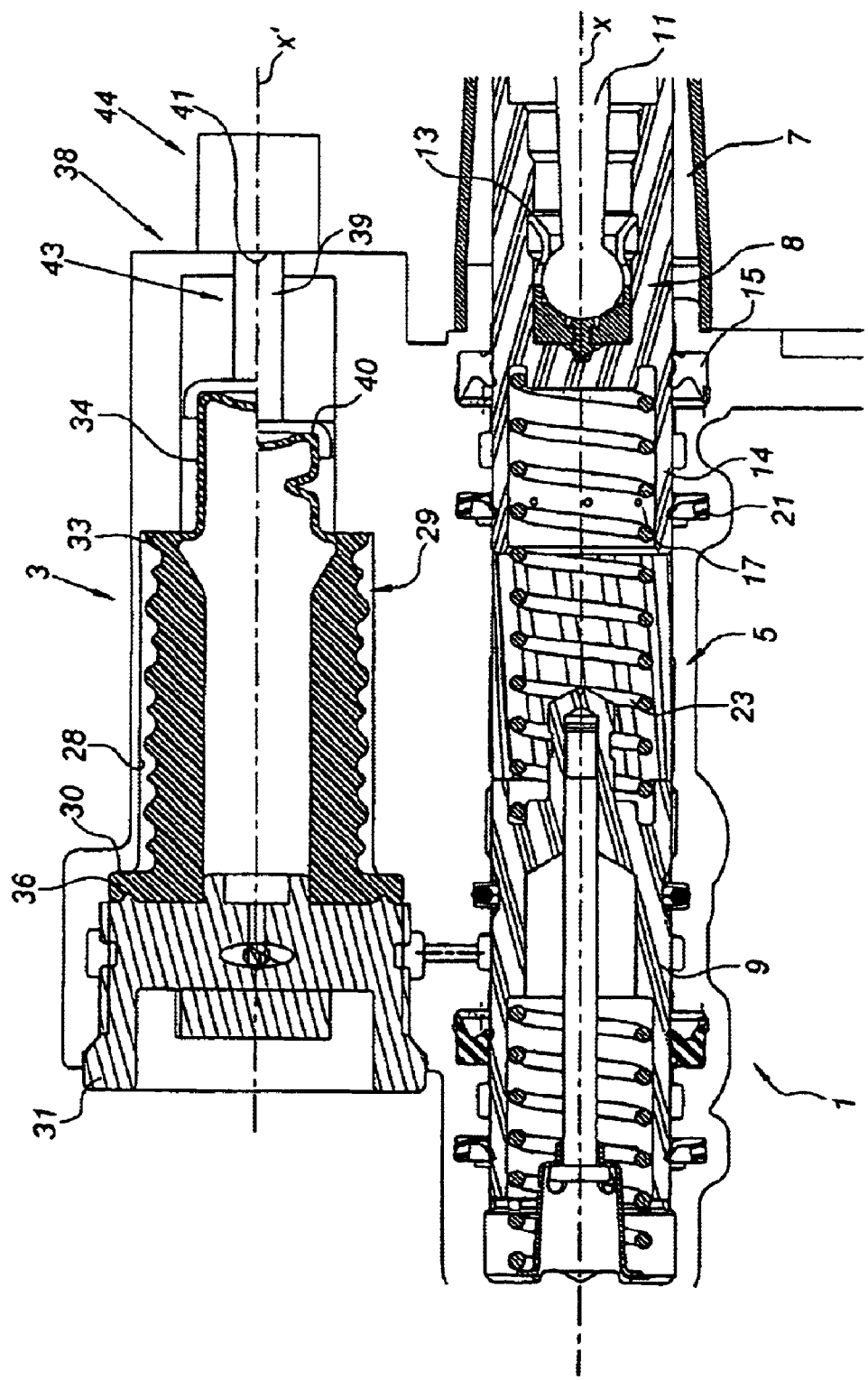

A braking device according to the present invention comprises a master cylinder (1) fitted with a pedal-feeling simulation cartridge (3), said master cylinder (1) being actuated by an actuating rod (11) connected to a brake pedal (12), said cartridge (3) comprising a resilient means (29) and compression means (38) for the resilient means (29). These compression means (38) can be actuated by a computer (81) on the detection of an injury risk concerning the driver's legs, so as to reduce the compression rate of the resilient means (29).

16 Claims, 2 Drawing Sheets

SAFETY BRAKING DEVICE AND A BRAKING SYSTEM COMPRISING SUCH DEVICE

This invention mainly relates to an improved-safety braking device, intended for reducing the injury risks concerning the driver, owing to the brake pedal if a collision happens, in particular a front impact and, more particularly, the invention deals with an electrohydraulic braking device having a variable hydraulic reaction.

Electrohydraulic braking systems of a known type comprise a master cylinder, actuated by an actuating rod connected to a brake pedal, at least one hydraulic pump supplying the brakes with hydraulic fluid, thus permitting the operation of the brakes, and a computer controlling the delivery of brake fluid to the brakes mounted at the wheels. In a normal operating situation, the master cylinder is not used for actuating the brakes, but merely for reproducing the braking feeling at the brake pedal, i.e. the hydraulic-circuit reaction which the driver would actually feel if the braking operation were taken charge of by a conventional hydraulic braking circuit. The braking operation takes place through the actuation of the hydraulic pump, which delivers brake fluid to the brakes following the detection of the driver's will to apply the brakes, and the solenoid valves stop interconnecting the master cylinder and the brakes. The detection of the will to apply the brakes involves various sensors, for instance a travel sensor, disposed at the brake pedal. The simulation of the usual braking feeling (the mechanical reaction of the circuit) is reproduced using a cartridge, communicating with the primary chamber of the master cylinder and comprising resilient means, simulating the brake fluid absorption by the braking circuit.

The reliability of such braking systems is further improved through the use of the master cylinder as a source of pressure brake fluid for the brakes, if the computer or the hydraulic pump happens to be unavailable.

In the case of an impact on the front part of the vehicle, the deformation of the engine compartment of the vehicle is most likely to cause the recoil of the master cylinder towards the passenger space and, with it, of the actuating rod and of the brake pedal, and to injure the driver, in particular his legs.

On a collision, if the driver's foot is on the brake pedal, and even if the pedal does not move back, his foot may be fractured just because of the mechanical reaction of the braking circuit.

In an attempt to reduce such injury risks, braking devices are known, which cause the exhaust of brake fluid to the outside of the circuit, thus leading to a pressure drop in the braking circuit, and enabling the brake pedal to penetrate into the master cylinder without any reaction. Yet, owing to the flammability of brake fluid, such a fluid occurrence inside the engine compartment may be quite hazardous and cause much more serious damages than those resulting from a back motion of the brake pedal.

Besides, another drawback of this kind of device is that a braking action is no longer possible.

Moreover, the repair of such devices after an impact is very expensive.

Therefore, it is an object of the present invention to provide an improved-safety braking device, so as to reduce injury risks owing to the brake pedal on a collision.

Another object of this invention consists in providing an improved-safety braking device with a simple and inexpensive design compared with the existing devices.

It is also an object of the present invention to provide an improved-safety electrohydraulic braking device, which may be easily adaptable to current electrohydraulic braking devices.

These objects are achieved, in accordance with this invention, by a braking device comprising a brake pedal, which is connected to a at least partially hydraulic generator of a braking feeling at the pedal, and having a variable absorption, a system for the detection of the driver's will to apply the brakes, such system being taken charge of by a computer, and a system for the detection of an injury risk, such injury-risk detecting system informing the computer of such an injury risk, and said computer controlling the absorption variation of the pedal-feeling simulation generator.

In other terms, the generator is fitted with means for a at least partial release of the resilient means simulating the pedal feeling, such means being actuated when an injury risk concerning the driver is detected and bringing about an absorption reduction of the braking device, thus reducing the injury risks concerning the driver.

An advantage of this invention lies in that its implementation does not require extensive alterations to a current device and in that it does not require much room either.

Advantageously too, the present invention makes it possible to use current computers, for instance the one used for triggering the inflation of the air bags.

Therefore, a subject matter of the present invention is a braking device, comprising an actuating rod connected by a first longitudinal end to a brake pedal, a pedal-feeling simulation cartridge connected to a second longitudinal end of said actuating rod, said cartridge comprising a resilient means, and compression means for said resilient means, characterised in that the compression rate of the resilient means is determined by the compression means and is capable of varying if an injury risk concerning the driver is detected.

More particularly, the present invention deals with a braking device intended for a braking system, comprising an actuating rod connected by a first longitudinal end to a brake pedal, a pedal-feeling simulation cartridge having a longitudinal axis and isolated from the braking system in a normal operating state, said cartridge comprising a resilient means, which may be elastically deformed by a pressure hydraulic fluid so as to transmit the reaction of a hydraulic braking circuit to the brake pedal through a second longitudinal end of the control rod, said reaction being predetermined by a compression rate of the elastically-deformable means, and said compression rate being set by compression means, characterised in that said device comprises means for varying the compression rate of the resilient means of said cartridge on order, on the detection of an injury risk concerning the driver, through an action exerted on the compression means.

Another subject matter of the present invention is a braking device, characterised in that the compression rate of the resilient means is determined by the axial position of the compression means along the axis.

According to another aspect, this invention provides a braking device, characterised in that the axial position of the compression means is determined by axial-indexing means.

Another subject matter still of the present invention is a braking device, characterised in that said compression means comprise a bearing element resting on the resilient means.

According to another aspect of the invention, a braking device is characterised in that the bearing element comprises a stem, capable of sliding inside the cartridge on the detection of an injury risk concerning the driver.

Another subject matter still of the present invention is a braking device, characterised in that the bearing element is held in position through the clamping of a first longitudinal end of the stem of the bearing element by the axial-indexing means.

The present invention also deals with a braking device, characterised in that the bearing element has, at a second longitudinal end facing away from the first end, rigidly locked with the cartridge, a support-forming cup for the resilient means.

According to another aspect of the invention, a braking device is characterised in that the axial-indexing means for the bearing element comprise a pyrotechnic charge, which may be triggered on the detection of an injury risk concerning the driver, so has to let the stem of the bearing element slide freely relative to the cartridge.

Another subject matter still of the present invention is a braking device, characterised in that the axial-indexing means for the bearing element comprise electromagnetic means, controllable on the detection of an injury risk concerning the driver so as to let the stem of the bearing element slide freely relative to the cartridge.

Another subject of the invention is a braking device, characterised in that the resilient means is made up of an elastomer.

This invention also deals with a braking device, characterised in that it is an electrohydraulic braking device comprising a master cylinder, actuated by the actuating rod and connected to the pedal-feeling simulation cartridge, and wherein, in a normal operating state, the inner space of said master cylinder communicates with the inner space of said cartridge whereas, in a deteriorated operating state, said master cylinder is capable of actuating the brakes directly.

According to another aspect of the invention, a braking system, comprising a control system for the brakes disposed at the wheels, and a detection system for an injury risk concerning the driver, is characterised in that it comprises a braking device according to the present invention.

This invention also deals with a braking system, characterised in that it comprises a braking device wherein, in a deteriorated operating state, the inner space of said master cylinder is connected to the brakes disposed at the vehicle wheels, by the opening of first solenoid valves, at least one computer controlling the opening and closing of the solenoid valves, at least one hydraulic pump connected to the brakes through second solenoid valves, and at least one sensor for the detection of an injury risk concerning the driver, characterised in that the axial-indexing means are controlled by the computer following the detection of an injury risk concerning the driver.

Another subject of the invention is a braking system, characterised in that, on the detection of an injury risk concerning the driver, the computer commands the pump to deliver brake fluid to the brakes.

Another subject matter still of the invention is a braking system, characterised in that the detection of an injury risk concerning the driver results from the detection of a deceleration value, which is greater than a predetermined value.

The present invention also deals with an electrohydraulic braking system, characterised in that it comprises connection means for a decelerometer of at least one air bag, wherein the detection by said decelerometer of a deceleration value, which is greater than a predetermined value, controls the reduction of the compression rate of the resilient means.

Figure 2:
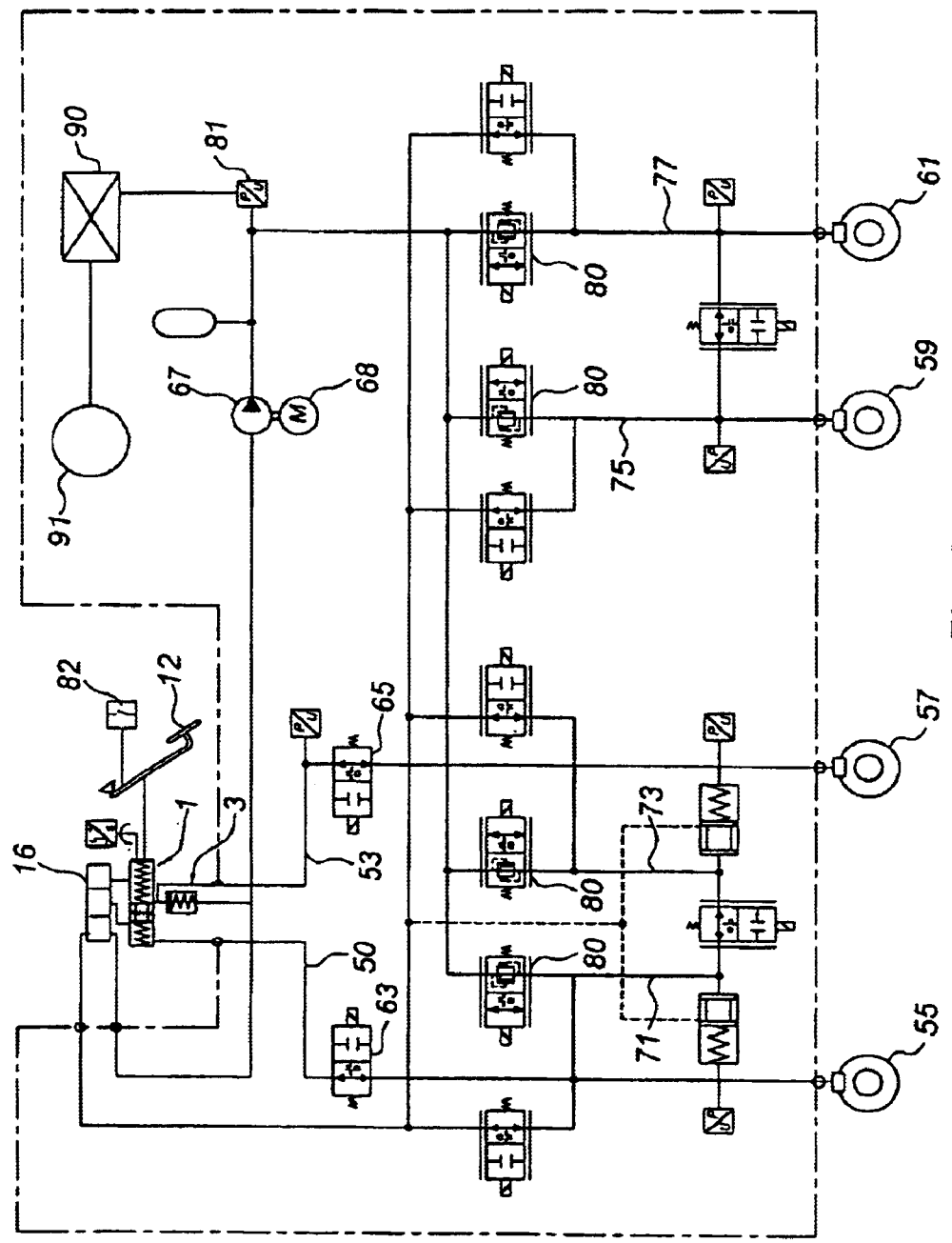

Other features and advantages of the present invention will be apparent from the following detailed description, by way of example and by no means as a limitation, when taken in conjunction with the accompanying drawings, in which FIG. 1 is a longitudinal sectional view of a master cylinder fitted with a pedal-feeling simulation cartridge according to this invention, and showing two loading rates for the resilient means inside the cartridge; and FIG. 2 is a functional diagram of an electrohydraulic braking circuit according to the present invention, comprising a master cylinder as per FIG. 1.

As a rule, in these drawings, the front part or the forward direction and the rear part or the rearward direction are the left-hand side and the right-hand side respectively.

FIG. 1 shows a master cylinder 1 having an axis X, which is fitted with a pedal-feeling simulation cartridge 3 according to this invention. The master cylinder comprises a primary chamber 5, in which a first and a second hydraulic pistons 7 and 9 are fitted for a leakproof sliding travel, and define primary and secondary hydraulic circuits, connected to the brakes. In a normal operating situation, solenoid valves stop the interconnection of the primary and secondary circuits and the brakes. At rest, and in accordance with the regulations in force, these solenoid valves must be open.

The primary hydraulic circuit alone will be described, because the structure of the secondary hydraulic circuit looks almost like that of the primary hydraulic circuit. The piston 7 comprises a body 8, exhibiting, at a first end facing rearwards, a substantially cone-shaped receiving cavity for an actuating rod 11, fitted without any clearance using holding means 13, the connecting rod 11 being connected to a brake pedal 12. The body is also provided, at a second end facing forwards, with a substantially cylindrical sleeve 14, fitted for a leakproof sliding motion inside the chamber 5. The tightness is ensured by sealing means 15, for instance a lip seal fitted stationarily in the body of the master cylinder. The periphery of the sleeve 14 is provided with radial passages 17, advantageously at regular intervals, for the resupply of the primary hydraulic circuit with brake fluid from a tank 16. When the piston moves in the forward direction in the chamber 5, the passages 17 are closed by a lip seal 21, advantageously disposed stationarily inside an annular groove made in the body of the master cylinder.

There is nothing to prevent either the stationary fitting of the lip seal 21 in an insert, which would be fixed in position relative to the body of the master cylinder, or the fitting of the seal 21 between a shoulder, formed in the inner periphery of the primary chamber 5 of the master cylinder, and e.g. an inserted ring.

A return spring 23 is compressively fitted in a pressure chamber 19, defined by the pistons 7 and 9, that is between the rear face of the hydraulic piston 9 and the end wall of the sleeve 14 of the hydraulic piston 7.

The pedal-feeling simulation cartridge 3 has a substantially cylindrical shape with an axis X' and, in the embodiment illustrated in FIG. 1, the axis X' of the cartridge 3 is advantageously parallel to the axis X of the master cylinder 1, but such cartridge 3 may be arranged in another direction as well. The cartridge comprises a blind bore 28 with an axis X', consisting of three portions, the diameters of which are decreasing from the front part to the rear part, whereas the transitions of these portions are shoulders 30, 33. The bore 28 accommodates a resilient means 29 and, in the illustrated example, such resilient means exhibits the shape of a sleeve having the axis X'. This sleeve comprises at a first end, facing rearwards, a cap 34 looking like a comparatively smaller-diameter sleeve while, at its second end facing forwards, i.e. in the opposite direction to that of the first end, it comprises a seat 36. The resilient means 29 is may be made up of rubber.

The possibility of manufacturing the resilient means 29 from various springs with various loading rates, for instance with variable pitches, and from rubber elements, may be contemplated just as well.

The resilient means 29 is compressively fitted in the bore 28 using compression means 38, which comprise a bearing element 39 rigidly locked with the cartridge. The resilient means 29 is compressively disposed between the bearing element 39 and a plug 31, sealing the open end of the blind bore 28 using e.g. a O ring (not shown). In an advantageous manner, the plug 31 fixes the resilient means 29 in place inside the cartridge 3, in that the seat 36 of the resilient means 29 is gripped between the rear face of the plug 31 and the shoulder 33 of the bore 28. The compression rate N, or the loading rate, of the resilient means 29 is determined according to the pedal feeling to be given to the driver, which means that the greater the compression rate, the harder the circuit reaction. In a normal braking situation, the compression rate N amounts to N1, as shown in FIG. 1 in the lower part of the illustrated cartridge 3.

Advantageously, the plug 31 is threaded so as to be screwed in the front portion of the bore 28, provided with an internal thread cooperating with the plug thread.

The plug 31 might also be secured in the cartridge body using glue or any other fixing means.

The compression means 38 comprise axial-indexing means 44 for the positioning of the bearing element 39 and for the adjustment of the loading rate of the resilient means 29.

In the example as illustrated, the bearing element 39 comprises a stem 43 having an axis X' and capable, on a collision, of sliding in the cartridge 3 in the outward direction. The stem 43 is fitted, at a first end facing forwards, with a cup 40 accommodating the closed end of the cap 34 of the resilient means 29 and translationally-locked relative to the cartridge 3, by a second end 41 facing away from said first end, through the axial-indexing means 44, most advantageously by clamping. The means 44 can be controlled by a computer so as to change the axial indexing of the bearing element 39, thus resulting in a variation of the loading rate as regards the resilient means 29.

Thanks to the indexing means 44, the bearing element 39 may take, for instance, two axial positions, namely a first position in which the resilient means 29 is compressed to a first loading rate N1 in a normal operating situation, and a second position in which the loading rate of the resilient means 29 is reduced to a second rate N2 so as to reduce the reaction of the hydraulic circuit, as shown in the upper part of the cartridge 3 represented in FIG. 1. The axial-indexing means comprise, for instance, a pyrotechnic charge, activated by a computer, advantageously the one controlling the air bag, and the triggering of the charge causes the rupture of the attachment of the end 41 of the stem 43 to the cartridge 3.

Of course, arrangements may be made to use indexing means 44 comprising mechanical means, e.g. a rack device, or electromagnetic means, controlled by the computer, and readily reusable after a triggering.

The bore 28, and more particularly the inside of the resilient sleeve 29 communicates with the chamber 19 by means of a radial passage 25 provided in the body of the master cylinder, between the primary chamber 5 and the inside of the cartridge 3, and by means of a passage 27 extending between the rear portion of the hydraulic piston 9 and the inner peripheral surface of the chamber 5.

Contrary to the primary hydraulic circuit, the secondary hydraulic circuit is not capable of being connected with the inside of the cartridge.

FIG. 2 shows a braking circuit, comprising the master cylinder according to this invention, in which the primary and secondary chambers are connected, through the pipes 50 and 53, with the brakes 55, 57, 59 and 61 at the wheels. The pipes are fitted with solenoid valves 63, 65 capable of separating the master cylinder from the brakes. The braking circuit also comprises at least one hydraulic pump 67, advantageously driven by an electric motor 68, and communicating with the brakes 55, 57, 59 and 61 through the pipes 71, 73, 75 and 77. Solenoid valves 80 are capable of isolating the pumps 67, 69 from the brakes 55, 57, 59, 61. The braking circuit also comprises an injury-risk detector (not shown), for instance the decelerometer of the air bag(s), and other sensors as well. A computer 81 receives data about the driver's will to apply the brakes, from the sensors, e.g. a travel sensor 82 for the actuating rod 11, and from the injury-risk detector, and the computer controls the opening and the closing of the solenoid valves 63, 65, 80 and the starting of the pumps 67, 69.

In a normal braking operation, some solenoid valves are closed, which means that they no longer interconnect the primary circuit, the secondary circuit and the brakes, with the result that the brake fluid, contained in the secondary circuit, is confined inside the secondary hydraulic chamber, and that the secondary piston 9 does not slide in the chamber 5 any longer.

At rest, the solenoid valves 63, 65 are open and therefore, if a dysfunctioning occurs in the electronic system, the primary and secondary chambers of the master cylinder are communicating with each other, which enables the master cylinder to supply brake fluid to the brakes 71, 73, 75 and 77, quite conventionally.

The mode of operation of the electrohydraulic braking device according to this invention will be explained now, both in an normal braking situation and on the detection of an injury risk, the latter corresponding e.g. to the detection, by the computer, of a deceleration speed D, which is higher than a predetermined value V.

In a normal deceleration braking, i.e. when the deceleration speed D is lower than the value V, the driver depresses the brake pedal, which brings about a forward travel of the actuating rod 11 and consequently a sliding motion of the piston 7. The tank and the chamber 19 stop communicating through the passages 17 as soon as the lip of the seal 21 covers the passages 17. The brake fluid is delivered to the cartridge 3 through the passages 25, 27, and the resulting pressure rise deforms the resilient means 29 to the compression rate N1. The compressive stresses, applied to the resilient means 29, make it possible to reproduce the reaction of the hydraulic circuit or the feeling at the brake pedal, like that the driver would get when decelerating a vehicle equipped with a conventional hydraulic braking circuit.

Simultaneously, a sensor (not shown), e.g. a travel sensor, detects the travel and the speed of motion of the actuating rod 11 and transmits these data to the computer, which commands the hydraulic pump(s) to deliver a determined brake fluid volume to the brakes, such brake fluid volume being set as a function of the braking level the driver wants.

On a collision, when an injury-risk detector, e.g. a decelerometer 90 of at least one air bag 91, measures a higher deceleration speed D than the predetermined value V, these data are transmitted to the computer.

Two cases may arise, as follow:

The first case is that in which the driver's foot is on the brake pedal when an injury risk is detected.

The computer commands, among others, the indexing means 44 to release the resilient means 29, by the disengagement of the stem 43 from the cartridge, with the result that the compression rate N of the resilient means becomes N2, N2 being lower than N1. Thus the resilient means 29 is partly decompressed and the pressure both in the cartridge and in the chamber 5 is reduced, the effect of which being that the brake pedal may offer a weaker resistance to the driver's foot than that the driver would feel if the resilient means 29 were normally compressed to the rate N1. Therefore the brake pedal will cause the driver only very slight hurts, if any at all.

The second case is that in which the driver's foot is not on the brake pedal when an injury risk is detected.

The computer commands, among others, the indexing means 44 to release the resilient means 29; by the disengagement of the stem 43 from the cartridge 3, with the result that the resilient means 29 is partly decompressed, and that the pressure both in the cartridge and in the chamber 5 is reduced. Therefore, the master cylinder may move, e.g. under the effect of the impact, relative to the actuating rod. As a matter of fact, because that the brake fluid pressure inside the master cylinder is low, the master cylinder may move more easily relative to the actuating rod. Accordingly a back motion of the brake pedal farther into the passenger space is limited, which means that the injury risks incurred are reduced as well.

Following an impact, the vehicle may happen to keep moving. Then, since the braking operation is independent of the pedal-feeling simulator, and if the brake control system is still functioning, provision may be made for the brake control system to command, as soon as an injury-risk is detected, the hydraulic pumps to deliver brake fluid to the brakes so as to bring the vehicle to a standstill.

Therefore the invention provides a braking device ensuring the driver an improved safety, and cooperating, in a simple and especially advantageous way, with the braking system already installed in the vehicle.

The present device is quite advantageous as regards electrohydraulic braking systems yet it is adaptable just as well to any other braking system whatsoever comprising a pedal-feeling generating device.

The present invention concerns, more particularly, the motor car industry.

And the present invention mainly applies to the design and manufacturing of braking systems for motor vehicles and, more especially, of braking systems for passenger cars.

I claim:

1. A braking device intended for a braking system, comprising an actuating rod (11) connected by a first longitudinal end to a brake pedal (12), a pedal-feeling simulation cartridge (3) having a longitudinal axis (X') and isolated from the braking system in a normal operating state, said cartridge (3) comprising a resilient means (29), which may be elastically deformed by a pressure hydraulic fluid so as to transmit the reaction of a hydraulic braking circuit to the brake pedal (12) through a second longitudinal end of the control rod (11), said reaction being predetermined by a compression rate of the elastically-deformable means (29), and said compression rate being set by compression means (38), characterised in that said device comprises means for varying the compression rate of the resilient means of said cartridge on order, on the detection of an injury risk concerning the driver, through an action exerted on the compression means (38).

2. The braking device according to claim 1, characterised in that the compression rate of the resilient means (29) is determined by the axial position of the compression means (38) along the axis (X').

3. The braking device according to claim 2, characterised in that the axial position of the compression means (38) is determined by axial-indexing means (44).

4. The braking device according to claim 3, characterised in that said compression means (38) comprise a bearing element (39) resting on the resilient means (29).

5. The braking device according to claim 4, characterised in that the bearing element (39) comprises a stem (43), capable of sliding in the cartridge (3) on the detection of an injury risk concerning the driver.

6. The braking device according to claim 5, characterised in that the bearing element (39) is held in position through the clamping of a first longitudinal end (41) of the stem (43) of the bearing element (39) by the axial-indexing means (44).

7. The braking device according to claim 6, characterised in that the bearing element (39) has, at a second longitudinal end facing away from the first end (41), rigidly locked with the cartridge, a support-forming cup (40) for the resilient means (29).

8. The braking device according to claim 6, characterised in that the axial-indexing means (44) for the bearing element (39) comprise a pyrotechnic charge, which may be triggered on the detection of an injury risk concerning the driver, so has to let the stem (43) of the bearing element (39) slide freely relative to the cartridge (3).

9. The braking device according to claim 6, characterised in that the axial-indexing means (44) for the bearing element (39) comprise electromagnetic means, controllable on the detection of an injury risk concerning the driver, so as to let the stem (43) of the bearing element (39) slide freely relative to the cartridge (3).

10. The braking device according to claim 8, characterised in that the resilient means (29) is made up of an elastomer.

11. The braking device according to claim 10, characterised in that it is an electrohydraulic braking device comprising a master cylinder (1), actuated by the actuating rod (11) and connected to the pedal-feeling simulation cartridge (3), and wherein, in a normal operating state, the inner space of said master cylinder communicates with the inner space of said cartridge (3) whereas, in a deteriorated operating state, said master cylinder is capable of actuating the brakes directly.

12. The braking device of claim 11 for use in a braking system having a control system for the brakes disposed at the wheels, and a detection system for an injury risk concerning the driver.

13. The braking device according to claim 12 wherein in a deteriorated operating state, the inner space of said master cylinder (1) is connected to the brakes (55, 57, 59, 61) disposed at the vehicle wheels, by the opening of first solenoid valves (63, 65), at least one computer (81) controlling the opening and the closing of the solenoid valves (63, 65), at least one hydraulic pump (67) being connected to the brakes (55, 57, 59, 61) through second solenoid valves (80), and at least one sensor for the detection of an injury risk, characterised in that the axial-indexing means (44) are controlled by the computer (81) following the detection of an injury risk concerning the driver.

14. The braking device according to claim 13, characterised in that, on the detection of an injury risk concerning the driver, a computer (81) commands the pump (67, 69) to deliver brake fluid to the brakes (55, 57, 59, 61).

15. The braking device according to claim 14, characterised in that the detection of an injury risk concerning the driver results from the detection of a deceleration value, which is greater than a predetermined value.

16. The braking device system according to claim 15, characterised in that it comprises connection means for a decelerometer (90) of at least one air bag (91), wherein the detection by said decelerometer of a deceleration value, which is greater than a predetermined value, controls the reduction of the compression rate of the resilient means (29).

* * * * *